United States Patent [19]

LeFevre

[11] 4,389,090

[45] Jun. 21, 1983

[54] FIBER OPTIC POLARIZATION CONTROLLER

[75] Inventor: Herve C. LeFevre, Los Altos, Calif.

[73] Assignee: The Board of Trustees of Leland Stanford Jr. Univ., Stanford, Calif.

[21] Appl. No.: 183,975

[22] Filed: Sep. 4, 1980

[51] Int. Cl.³ .............................................. G02B 5/172
[52] U.S. Cl. ................................. 350/96.29; 350/403
[58] Field of Search .................. 350/96.15, 96.29, 400, 350/403, 406; 333/21 A

[56] References Cited

U.S. PATENT DOCUMENTS 4,261,639  4/1981  Kogelnik et al. ................ 350/96.15
4,280,766  7/1981  Goss et al. ...................... 350/370 X

FOREIGN PATENT DOCUMENTS 2418534  10/1974  Fed. Rep. of Germany ... 350/96.15

OTHER PUBLICATIONS

Ulrich et al., *Single-Mode Fiber-Optical Polarization Rotator*, Applied Optics, vol. 18, No. 11, Jun. 1, 1979, pp. 1857-1861.
*Polarization Controller Can Maintain Light Polarization in Single ModeFiber*, Laser Focus, Feb. 1981, pp. 58, 62.
Barnoski et al., *Measurements in Fiber Optics*, Proc. of the IEEE, vol. 66, No. 4, Apr. 1978, pp. 429, 434 & 435 cited.

*Primary Examiner*—Paul L. Gensler
*Attorney, Agent, or Firm*—Knobbe, Martens, Olson, Hubbard & Bear

[57] ABSTRACT

Fiber optic device for controlling the state of polarization of light. In one embodiment, a strand of fiber optic material is bent into a generally planar coil of relatively tight radius to stress the material and form a birefringent medium having principal axes which are rotated to control the polarization of light passing through the strand. In a second embodiment, one portion of a fiber optic strand is twisted about its axis to change the polarization, and a second portion of the strand is formed into a coil which is free to change in radius without additional twisting as the first portion is twisted.

10 Claims, 3 Drawing Figures

FIBER OPTIC POLARIZATION CONTROLLER

This invention pertains generally to single mode fiber optics and more particularly to a single mode fiber optic device for controlling the state of polarization of light passing therethrough.

The fabrication of very low loss single mode fibers had made it possible to use such fibers in telecommunication systems and also in interferometric applications. The fact that it is possible to use interferometric arms with a length of one kilometer or more has substantially increased the sensitivity of classical optical interferometers used as sensors for rotation, electrical current or acoustical pressure. However, in doped silica fibers, these very long optical paths produce a modification of the state of polarization as a function of thermal stress, mechanical stress, and irregularities in the shape of the core. Heretofore, there have been some attempts to provide compensation for these undesired changes in polarization. However, there is still a need for better control of the state of polarization in such fibers.

It is in general an object of the invention to provide a new and improved device for controlling state of polarization in fiber optic systems.

Another object of the invention is to provide a device of the above character which is economical and easy to manufacture.

These and other objects are achieved in accordance with the invention by employing a strand of fiber optic material which is twisted and coiled to control the polarization of light passing through the strand. In one embodiment, the strand is bent into a generally planar coil of relatively tight radius to stress the material and form a birefringent medium having principal axes which are rotated to control the polarization of light passing through the strand. In a second embodiment, one portion of the strand is twisted about its axis to change the polarization of the light, and a second portion of the strand is formed into a coil which is free to change in radius without additional twisting as the first portion is twisted.

Figure 1:
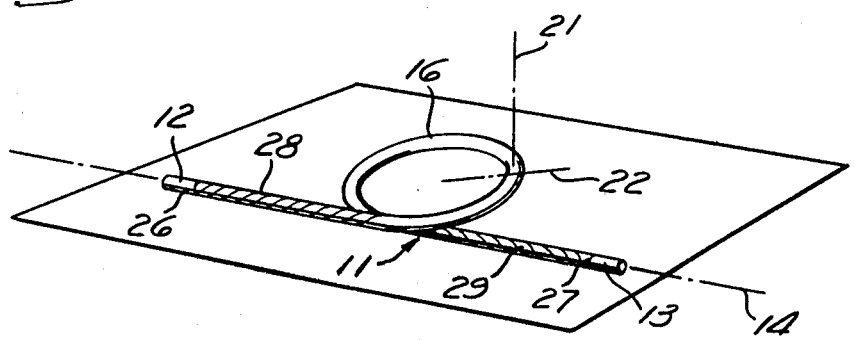
FIG. 1 is a perspective view, somewhat schematic, of one embodiment of a fiber optic polarization controller according to the invention.

The embodiment of FIG. 1 includes a strand 11 of single mode fiber optic material having end portions 12, 13 aligned along an axis 14, and a central portion formed into a coil 16 between the end portions. The strand 11 comprises a single fiber of quartz glass or other suitable silica material which is doped to have a central core portion and an outer cladding portion. In a single mode fiber, the core typically has a diameter on the order of 5–15 microns, and the cladding has a diameter on the order of 80–125 microns. For ease of illustration, the diameter of the fiber has been greatly exaggerated in the drawings. This fiber is an isotropic material which normally exhibits little or no appreciable birefringence.

The coil 16 in strand 11 is a generally planar coil of relatively tight radius (e.g. 0.85 cm) to stress the material and thereby produce birefringence by a photoelastic effect in the coil 16. With a uniform radius of curvature and the relatively small size and central location of the core within a single mode fiber, the stress to which the core is subjected is substantially uniform throughout the coil 16, and consequently the birefringent effect is substantially uniform throughout the coil 16. The birefringent medium thus created has a first principal axis 21 perpendicular to the plane of the coil 16, and a second principal axis 22 extending radially of the coil 16.

The birefringent effect produced by the coil 16 is a uniaxial negative birefringence, with axis 21 as the ordinary (slow) axis and axis 22 as the extraordinary (fast) axis.

End portions 12, 13 extend in a tangential direction from the coil 16, and the axis 14 of the end portions 12, 13 lies in the plane of the coil. The end portions are affixed in a stationary position at points 26, 27, respectively toward the outer ends thereof.

Rotation of the plane of coil 16 about axis 14 produces a controlled change in the polarization of light passing through strand 11. As the coil is rotated, twists 28, 29 of opposite sense are formed in the end portions of the strand between points 26, 27, respectively and the coil. In each of the twisted portions 28, 29 of the strands, the polarization of the incident light is rotated through an angle $\alpha' = t \cdot \alpha$, where $\alpha$ is the angle of rotation of the coil 16 and $t$ is a coefficient of twist, which has a value dependent upon the elastic and elasto-optic properties of the fiber optic material. For a doped silica single mode fiber, the constant $t$ has a value on the order of 0.08.

Rotation of the coil 16 also rotates the principal axes 21, 22 of birefringence, which produces a change in polarization. The change in polarization is a function of the amount of birefringence and is governed by the same principles as $\lambda/n$ plates in classical optics, where $n$ is a number, most commonly 2, 4 or 8. The change in polarization which rotation of the coil 16 produces is significantly greater than the change in polarization produced by the twisted portions 28, 29 of the strand 11.

The spatial delay $\delta$ between the principal polarization axes 21, 22 provided by the birefringence of the embodiment of FIG. 1 is given by the relationship $$\delta = a \cdot \theta \cdot (r/R)^2$$

where $a$ is a constant dependent upon the photoelastic coefficient of the fiber optic material employed, $\theta$ is the length of the coil 16, $r$ is the radius of the fiber, and $R$ is the radius of curvature of the coil 16. The length of the coil 16 is, of course equal to $2\pi NR$, where $N$ is the number of turns in the coil. By adjusting the radius of curvature and/or the number of turns in the coil 16, any desired spatial delay can be provided.

Two particularly interesting applications of the embodiment of FIG. 1 occur when the radius of curvature and the number of turns in the coil 16 are adjusted to provide a spatial delay of $\lambda/2$ or $\lambda/4$, the fiber optic analogs of the half wave plate and the quarter wave plate in classical optics. With a single mode fiber having a diameter of 80 microns and light having a wavelength of 0.663 microns, a coil having two turns and a radius of 0.85 cm provides a $\lambda/2$ system; and a coil having one turn and a radius of 0.85 cm provides a $\lambda/4$ system. Through a $\lambda/2$ system, the polarization is symmetrized with regard to the principal axes 21, 22, and rotation of the coil 16 through an angle $\alpha$ results in a change in polarization of $2 \cdot (1-t) \cdot \alpha$. In other words, a coil rotation of ±48.6° is sufficient to provide a polarization adjustment of ±90°.

Figure 2:
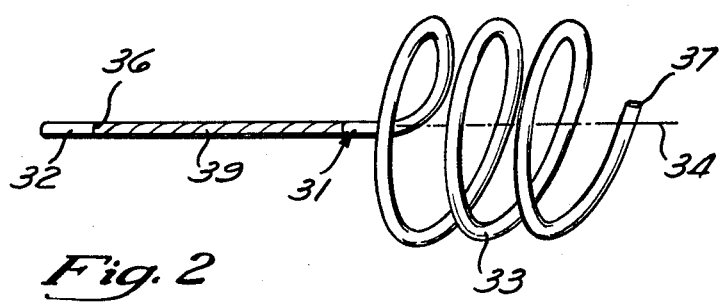
FIG. 2 is a perspective view of a second embodiment of a fiber optic polarization controller according to the invention.

The embodiment of FIG. 2 comprises a strand 31 of single mode fiber optic material similar to strand 11. Strand 31 has an axially extending portion 32 having an axis 34 and a helically coiled portion 33 oriented with the axis of the coiled portion 33 in alignment with the axis 34 of the axially extending portion 32.

The axially extending portion 32 of the strand 31 is affixed in a stationary position at a point 36 spaced from one end of the coil 33. At the other end 37 of the coil 33, the strand 31 is likewise secured in a fixed position.

In the embodiment of FIG. 2, a change in polarization is produced by twisting the strand 31 about axis 34 to produce a twist 39 between fixed point 36 and coil 33. In a straight fiber without the coil 33, an additional and opposite twist (not shown) would be created simultaneously with twist 39, in a manner similar to the formation of twists 28, 29 in the embodiment of FIG. 1. This additional twist would introduce an additional change in polarization which would cancel the change produced by twist 39, and consequentially, there would be no net change in polarization through the fiber.

However, in the embodiment of FIG. 2, coil 33 is flexible and free to change in radius as the strand 31 is twisted only in region 39, and there is no additional twisting of the fiber in the coil 33 to offset the change in polarization produced by twist 39. Therefore, a controlled change in polarization between the ends of the strand 31 can be effected simply by twisting the strand 31 about the axis 34.

Figure 3:
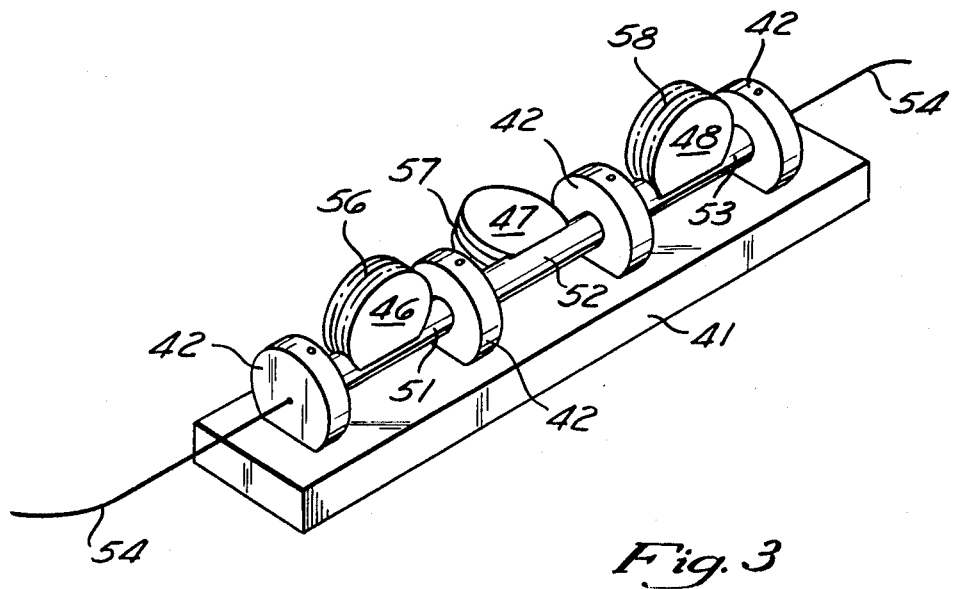
FIG. 3 is an isometric view of a third embodiment of a fiber optic polarization controller according to the invention.

The embodiment of FIG. 3 includes a horizontally extending base 41 on which a plurality of upright blocks 42 are mounted. Between adjacent ones of the blocks 42, spools 46-48 are mounted on shafts 51-53 which are aligned axially and rotatably mounted in the corresponding blocks. The spools 46-48 are generally cylindrical, and are positioned tangentially of the corresponding shafts 51-53, with the axes of the spools 46-48 being perpendicular to the axes of the shafts 51-53.

A strand 54 of fiber optic material extends through axial bores in shafts 51-53 and is wrapped about spools 46-48 to form three coils 56-58 with birefringent properties similar to the coil 16 of embodiment of FIG. 1. The strand 54 extends tangentially from each of the spools 46-48, and the three coils 56-58 can be rotated independently about the axes of the shafts 51-53 to adjust the polarization of light passing through the strand 54.

In one particularly preferred embodiment, the diameters and numbers of turns in the coils are such that outer coils 56, 58 provide a spatial delay of λ/4; and central coil 57 provides a spatial delay of λ/2. In this embodiment, the λ/4 coils 56 and 58 control the ellipticity of the polarization, and the λ/2 coil 57 controls the direction of the polarization. This combination permits any state of polarization to be changed into any other state of polarization.

It is apparent from the foregoing that a new and improved fiber optic device for controlling polarization has been provided. While only certain presently preferred embodiments have been described in detail, as will be apparent to those familiar with the art, certain changes and modifications can be made without departing from the scope of the invention as defined by the following claims.

What is claimed is:

1. In a fiber optic device for controlling the state of polarization of light passing therethrough: a strand of fiber optic material having end portions and a central portion between said end portions, said central portion being bent into a generally planar coil to stress the fiber optic material to provide a birefringent medium, the end portions of the strand extending tangentially from the coil, each of the end portions being affixed in a stationary position at a predetermined point, the plane of the coil being rotated about the end portions to twist the end portions between the coil and the fixed points and to effect a change in the polarization of the light passing between the end portions of the strand.

2. The device of claim 1 wherein the strand comprises a strand of single mode fiber optic material.

3. The device of claim 1 wherein the radius of curvature and the number of turns in the coil are chosen to provide a spatial delay of λ/n where λ is the wavelength of the light in the fiber optic material and n is a predetermined number.

4. The device of claim 1 wherein a second coil similar to the first named coil is formed between the end portions of the strand, said coils being rotatable independently of each other about the axis of the end portions.

5. In a fiber optic device for controlling the polarization of light passing therethrough: a strand of fiber optic material having an extending portion and a helically coiled portion, the extending portion being affixed in a stationary position at a point spaced from the helically coiled portion and being twisted between the fixed point and the helically coiled portion to stress the extending portion of the strand and rotate the polarization of light therein, the helically coiled portion being flexible and free to change in radius without additional twisting as the extending portion of the strand is twisted.

6. The device of claim 5 wherein the strand comprises a strand of single mode fiber optic material.

7. In a fiber optic device for controlling the polarization of light passing therethrough: a plurality of axially aligned, independently rotatable shafts, a generally cylindrical spool positioned tangentially of each said shaft and affixed thereto, and a strand of fiber optic material extending axially through the shafts and being wrapped about the spools to form coils which can be independently rotated about the axis of the shafts to adjust the polarization of light passing through the strand.

8. The device of claim 7 wherein three coils are provided, two of said coils providing a spatial delay of λ/4 and the third coil providing a spatial delay of λ/2, where λ is the wavelength of the light passing through the strand.

9. A method for controlling polarization of light in a fiber optic device, comprising the steps of:
forming a coil in a strand of fiber optic material;
stressing the coiled fiber optic material to produce by a photoelastic effect a birefringent medium;
extending a first end portion of the fiber optic strand tangentially away from the coil;
extending a second end portion of the fiber optic strand tangentially away from the coil;
rotating the coil about the tangent line defined by the first or second end portions of the first optic strand to change the polarization of light passing through the coil;
affixing the first end portion of the fiber optic strand in a stationary position at a first point;

affixing the second end portion of the fiber optic strand at a second stationary position at a second point; and twisting the first and second end portions of the fiber optic strand through a predetermined angle to produce a controlled change in the polarization of light passing through the first and second end portions of the fiber optic strand.

10. A method for controlling the polarization of light in a fiber optic device, comprising the steps of:

forming a first helically coiled portion in a strand of fiber optic material;

extending a second portion of the strand of fiber optic material in alignment with the axis of the helically coiled portion;

affixing the second portion in a stationary position relative to the first helically coiled portion at a point spaced from the first helically coiled portion; and twisting the second portion without twisting the first helically coiled portion to rotate the polarization of light passing through the second portion.

* * * * *